(12) United States Patent
Lin et al.

(10) Patent No.: US 12,175,028 B1
(45) Date of Patent: Dec. 24, 2024

(54) KNOB DEVICE FOR DISPOSING ON TOUCH SCREEN

(71) Applicant: HIGGSTEC INC., Yilan County (TW)

(72) Inventors: Tzu-Chien Lin, Yilan County (TW); Hsueh-Ju Chen, Yilan County (TW); Yung-Chuan Hsu, Yilan County (TW)

(73) Assignee: HIGGSTEC INC., Yilan County (TW)

( * ) Notice: Subject to any disclaimer, the term of this patent is extended or adjusted under 35 U.S.C. 154(b) by 0 days.

(21) Appl. No.: 18/515,694

(22) Filed: Nov. 21, 2023

(51) Int. Cl.
    *G06F 3/0362* (2013.01)
    *G06F 3/01* (2006.01)
    *G06F 3/039* (2013.01)

(52) U.S. Cl.
    CPC ............ *G06F 3/0362* (2013.01); *G06F 3/016* (2013.01); *G06F 3/0393* (2019.05)

(58) Field of Classification Search
    CPC .............................. G06F 3/0362; G06F 3/0393
    See application file for complete search history.

(56) References Cited

U.S. PATENT DOCUMENTS

| | | | |
|---|---|---|---|
| 10,007,378 B2 | 6/2018 | Ligameri et al. | |
| 11,182,066 B2 | 11/2021 | Choi et al. | |
| 11,556,214 B2 | 1/2023 | Da Silva et al. | |
| 2018/0136738 A1* | 5/2018 | Argiro | G06F 3/0393 |
| 2020/0301547 A1* | 9/2020 | Mori | G06F 3/0362 |
| 2024/0192795 A1* | 6/2024 | Jacobs | G06F 3/0362 |

FOREIGN PATENT DOCUMENTS

| | | |
|---|---|---|
| TW | I678662 | 12/2019 |
| TW | 202009659 | 3/2020 |
| TW | I689857 | 4/2020 |

\* cited by examiner

*Primary Examiner* — Kevin M Nguyen
(74) *Attorney, Agent, or Firm* — MUNCY, GEISSLER, OLDS & LOWE, P.C.

(57) ABSTRACT

A knob device for disposing on a touch screen, comprising a base provided with a plurality of recovery elastic components; and an operating cap disposed on the base. The operating cap have a rotation stroke and a pressing stroke, and is provided with a plurality of touch control pads, each of the pads has a working surface. The working surface of at least one of the touch control pads is not at a same height as the working surfaces of the other touch control pads. When the rotation stroke is performed, the working surfaces of some of the touch control pads contact the touch screen to activate a rotational touch control. When the pressing stroke is performed, the working surfaces of the touch control pads contact the touch screen jointly to activate a click and touch control.

9 Claims, 8 Drawing Sheets

KNOB DEVICE FOR DISPOSING ON TOUCH SCREEN

FIELD OF THE INVENTION

The invention relates to a knob device, and more particularly to a knob device for disposing on a touch screen.

BACKGROUND OF THE INVENTION

Conventional touch monitors use virtual operation keys displayed on the panel to provide users with screen control. In order to enhance the user's real sense of operation, touch monitors are equipped with additional physical operation knobs. The physical operation knob is independently assembled on the touch surface of the touch monitor, there is no need to open an additional mounting hole on the panel, thereby maintaining the strength of the panel and reducing processing costs. At the same time, the disposing position of the physical operation knob on the panel can be adjusted based on requirements, which has the characteristics of flexible application. As disclosed in the U.S. Pat. No. 10,007,378B, TW I678662, U.S. Pat. Nos. 11,182,066B, 11,556,214B, TW 202009659 and TW 1689857.

Among the above disclosed patents, TW 202009659 and TW 1689857 further disclose that the operation knob can provide rotational touch control function and press click function. However, the touch control pads provided for the operation knobs of the above two patents must be set independently before leaving the factory, thus each of the touch control pads can independently perform corresponding control functions only after being configured on the touch monitor. However, the aforementioned setting method of the touch control pad has to coordinate with the structural design, resulting in a complicated mechanism, which is not conducive to implementation.

SUMMARY OF THE INVENTION

A main object of the invention is to solve the problem of complicated setting mechanism of the conventional operation knob.

In order to achieve the above object, the invention provides a knob device for disposing on a touch screen, comprising a base and an operating cap disposed on the base, the base is provided with a plurality of recovery elastic components, the operating cap has a rotation stroke for rotating relative to the base, and a pressing stroke for pressing the recovery elastic components, the operating cap is provided with a plurality of touch control pads, each of the touch control pads comprises a working surface configured to contact the touch screen. The working surface of at least one of the touch control pads is not at a same height as the working surfaces of the remaining touch control pads. When the operating cap performs the rotation stroke, working surfaces of some of the touch control pads contact the touch screen to activate a rotational touch control of the knob device; when the operating cap performs the pressing stroke, the working surfaces of the plurality of touch control pads contact the touch screen jointly to activate a click and touch control of the knob device.

In one embodiment, the operating cap is provided with a bracket connected to the base, and the bracket is formed with a plurality of mounting holes provided for disposing the touch control pads therein.

In one embodiment, a quantity of the mounting holes is greater than a quantity of the touch control pads.

In one embodiment, at least one of the touch control pads is provided with at least one auxiliary return component located on a side away from the working surfaces.

In one embodiment, the base comprises a base plate connected to the recovery elastic components, and a bearing ring provided on the base plate and connected to the bracket, the base plate is provided with at least one assembly block, and the bearing ring is provided with at least one assembly slot coordinating with the at least one assembly block.

In one embodiment, the bearing ring is provided with a retaining wall for limiting an assembly position of the bracket.

In one embodiment, the knob device has an adhesive disposed on the base.

In one embodiment, the operating cap is provided with a tactile feedback component facing the base and for rotating relative to the base, the tactile feedback component is formed with a plurality of convex portions and a plurality of concave portions connected with one another alternately, and the base is provided with at least one column connected with at least one of the recovery elastic components and for contacting a surface of the tactile feedback component.

In one embodiment, the tactile feedback component has a plurality of notches facing the touch control pads.

Through the foregoing implementation of the invention, compared with the prior art, the invention has the following characteristics: the invention is provided with the touch control pads, and the working surface of at least one of the touch control pads is not at a same height as the working surfaces of the remaining touch control pads, when the operating cap performs the rotation stroke, some of the touch control pads contact the touch screen to activate a rotational touch control of the knob device; when the operating cap performs the pressing stroke, the touch control pads contact the touch screen jointly to activate a click and touch control of the knob device. Compared with the prior art, when implementing the knob device of the invention, it is not necessary to separately set the touch control pads, and a current operation of the knob device can be determined directly based on touch control of the touch control pads.

DETAILED DESCRIPTION OF THE PREFERRED EMBODIMENTS

The detailed description and technical content of the invention are described below with reference to the accompanying drawings.

Please refer to FIG. 1, FIG. 2, FIG. 3, FIG. 4, FIG. 5, and FIG. 6. The invention provides a knob device 10. The knob device 10 is used on a touch screen 30 to perform touch control on the touch screen 30. Touch control functions of the knob device 10 of the invention comprise rotational touch control and click and touch control. The rotational touch control here refers to selection of menu content displayed on the touch screen 30 after the knob device 10 is operated, similar to operating a mouse to slide a cursor; and the click and touch control selects menu content displayed on the touch screen 30, similar to clicking a mouse button.

The knob device 10 comprises a base 11 and an operating cap 12. The base 11 serves as a basic carrier of the knob device 10 to provide disposing of the operating cap 12. The base 11 is distributed with a plurality of recovery elastic components 111. The recovery elastic components 111 have elastic properties. The plurality of recovery elastic components 111 are capable of storing elastic acting force after being compressed, and releasing the stored elastic acting force when compression is released. The distributed manner referred to in this specification does not limit the recovery elastic components 111 being evenly distributed on the base 11, but the recovery elastic components 111 are not concentrated at a same place on the base 11, which is sufficient to support the operating cap 12.

The operating cap 12 is used to operate the knob device 10 and is butted against by the recovery elastic components 111. The operating cap 12 has a rotation stroke 121 and a pressing stroke 122 based on a user's operation. When the operating cap 12 performs the rotation stroke 121, the operating cap 12 rotates relative to the base 11. When the operating cap 12 performs the pressing stroke 122, the operating cap 12 presses the recovery elastic components 111 and displaces relative to the base 11.

The operating cap 12 is provided with a plurality of touch control pads 123. Each of the plurality of touch control pads 123 comprises a working surface 124. The working surface 124 is located on one side of each touch control pad 123. When the knob device 10 is implemented in conjunction with the touch screen 30, the working surfaces 124 of each touch control pad 123 face the touch screen 30 and are for contacting with the touch screen 30. It should be understood that when the working surfaces 124 of the plurality of touch control pads 123 contact with the touch screen 30, an electrical signal of the touch screen 30 will be changed, causing the touch screen 30 to generate corresponding control, such as selection operation or click operation. In addition, the working surfaces 124 of the plurality of touch control pads 123 are not at an equal height, and the working surface 124 of at least one of the touch control pads 123 and the working surfaces 124 of the remaining touch control pads 123 are not on a same horizontal plane. When the operating cap 12 performs the rotation stroke 121, only the working surfaces 124 of some of the plurality of touch control pads 123 contact the touch screen 30 to achieve rotational touch control by the knob device 10; when the operating cap 12 performs the pressing stroke 122, the working surfaces 124 of all of the plurality of touch control pads 123 contact the touch screen 30 to achieve click and touch control by the knob device 10. It should be noted that the invention does not limit a direction of the rotation stroke 121. The operating cap 12 is for rotating relative to the base 11 based on an operation condition, and causing the knob device 10 to generate a corresponding rotational touch control.

For the implementation description of the knob device 10, please refer to FIG. 1, FIG. 2, FIG. 3, FIG. 4, FIG. 5, and FIG. 6. It is assumed that the knob device 10 is not operated to perform the rotation stroke 121 or the pressing stroke 122 initially. At this time, the working surface 124 of at least one of the touch control pads 123 is not in contact with the touch screen 30, and the working surfaces 124 of the remaining touch control pads 123 are in contact with the touch screen 30, as shown in FIG. 1, FIG. 2, FIG. 3, and FIG. 5. Please refer to FIG. 3, when the knob device 10 is operated and the operating cap 12 is caused to perform the rotation stroke 121, the operating cap 12 does not press the recovery elastic components 111, but only drives the touch control pads 123 to rotate, so that the positions of the working surfaces 124 on the touch screen 30 is changed. At this moment, the operating cap 12 contacts the touch screen 30 with the working surfaces 124 of some of the touch control pads 123, and the touch screen 30 recognizes rotational touch control of the knob device 20 based on an electrical signal generated with the knob device 20, thereby the touch screen 30 executes selection function.

Figure 6:
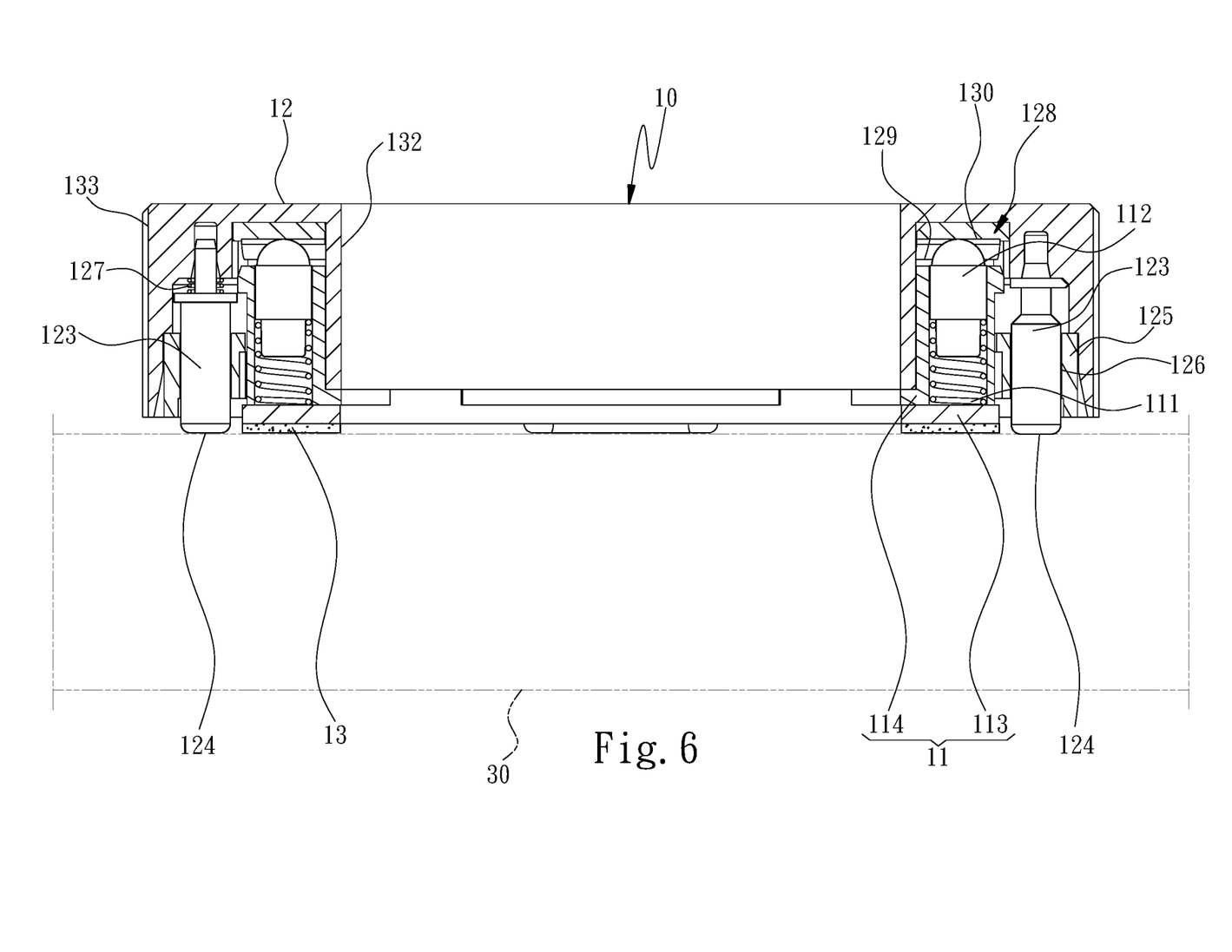
FIG. 6 is a cross-sectional view of an embodiment of the invention during implementation.

Please refer to FIG. 6, when the knob device 10 is exerted with a force to make the operating cap 12 perform the pressing stroke 122, the operating cap 12 presses the recovery elastic components 111, causing the working surfaces 124 of all of the plurality of touch control pads 123 to contact with the touch screen 30. That is to say, the working surfaces 124 that are in contact with the touch screen 30 before the pressing stroke 122 is performed remain in contact with the touch screen 30, and the working surfaces 124 that are not in contact with the touch screen 30 before the pressing stroke 122 is performed are pushed to contacting the touch screen 30. In this way, the touch screen 30 recognizes click and touch control of the knob device 20 based on an electrical signal generated with the knob device 20, and executes click function. When the knob device 10 is not exerted with a force, the operating cap 12 is butted against by the plurality of recovery elastic components 111 and returns, the operating cap 12 drives the plurality of touch control pads 123 to return, so that the working surface 124 of at least one of the touch control pads 123 returns to the position that does not contact with the touch screen 30.

It can be known from the foregoing that, the knob device 10 of the invention determines operation of the knob device 10 through a height relationship between the working surfaces 124 of the plurality of touch control pads 123. Further, when the knob device 10 is implemented in conjunction with the touch screen 30, when the operating cap 12 performs the rotation stroke 121, the working surfaces 124 of some of the touch control pads 123 contact the touch screen 30 to achieve rotational touch control of the knob device 10; when the operating cap 12 performs the pressing stroke 122, the working surfaces 124 of the touch control pads 123 jointly contact the touch screen 30 to achieve click and touch control of the knob device 10. Compared with the prior art, the knob device 10 of the invention does not need to be designed independently for touch control functions of the touch control pads 123, which can effectively reduce complicated setting and facilitate implementation of the knob device 10.

Figure 1:
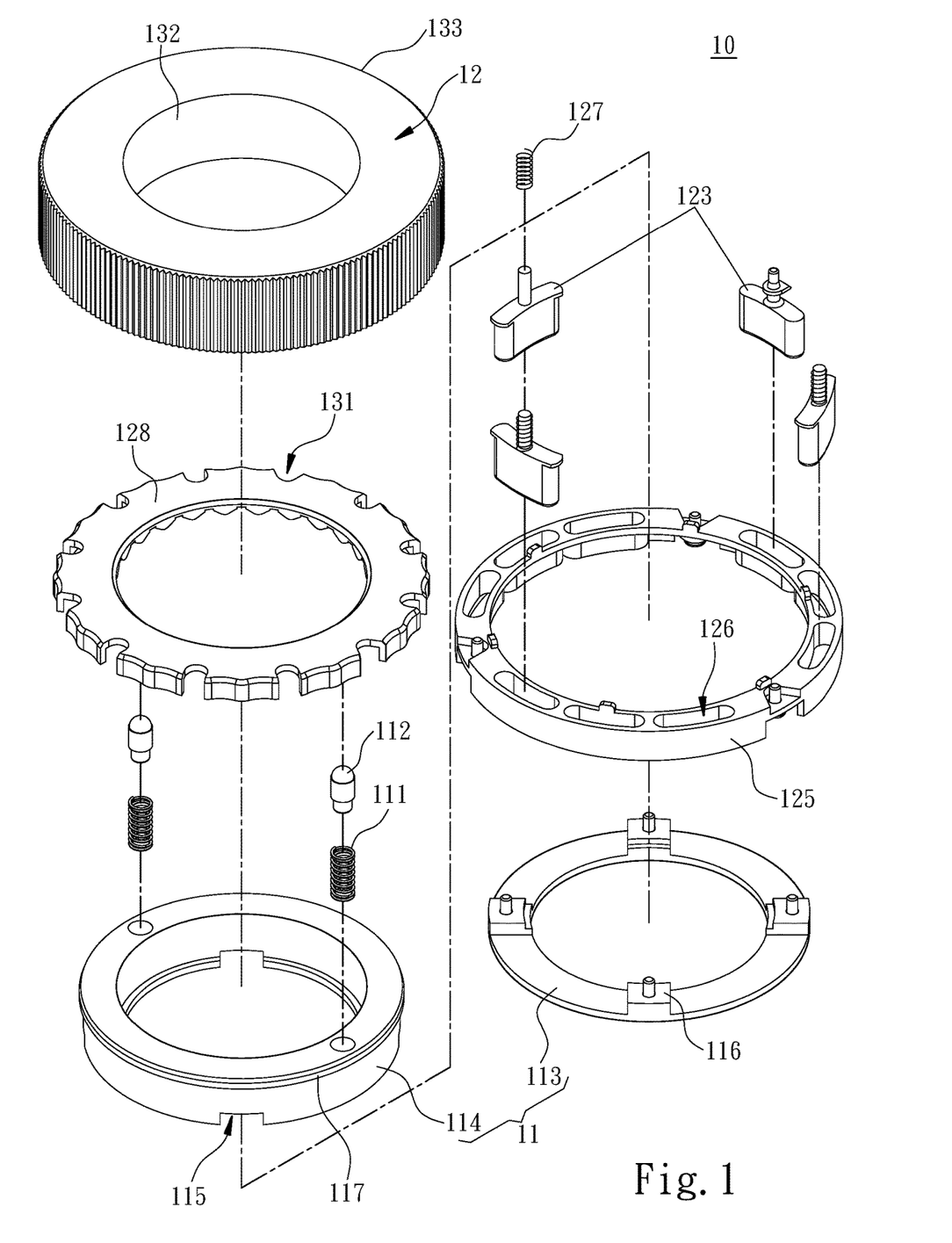
FIG. 1 is an exploded perspective view of an embodiment of the invention.
Figure 2:
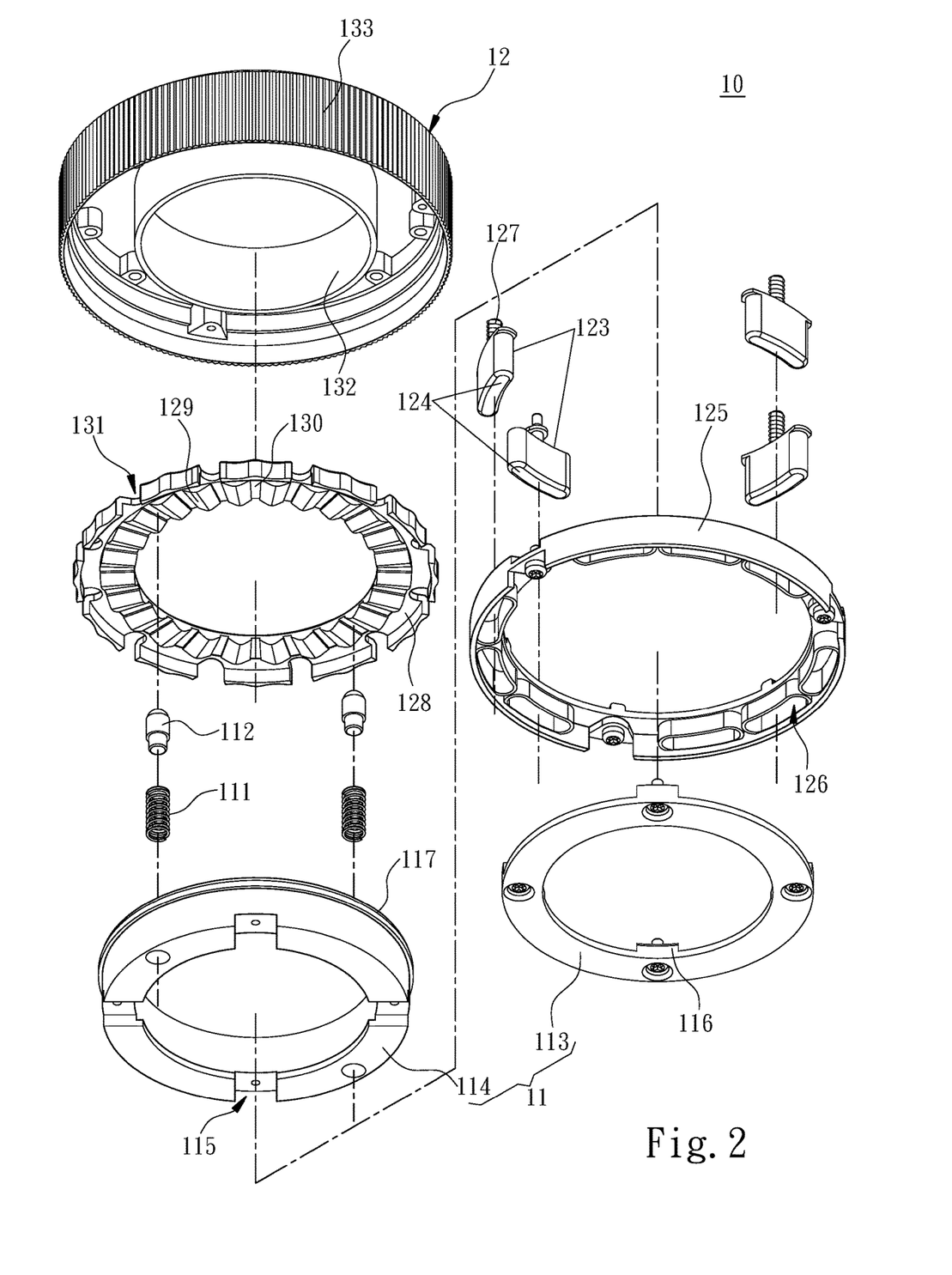
FIG. 2 is an exploded perspective view of an embodiment of the invention viewed from another direction.
Figure 3:
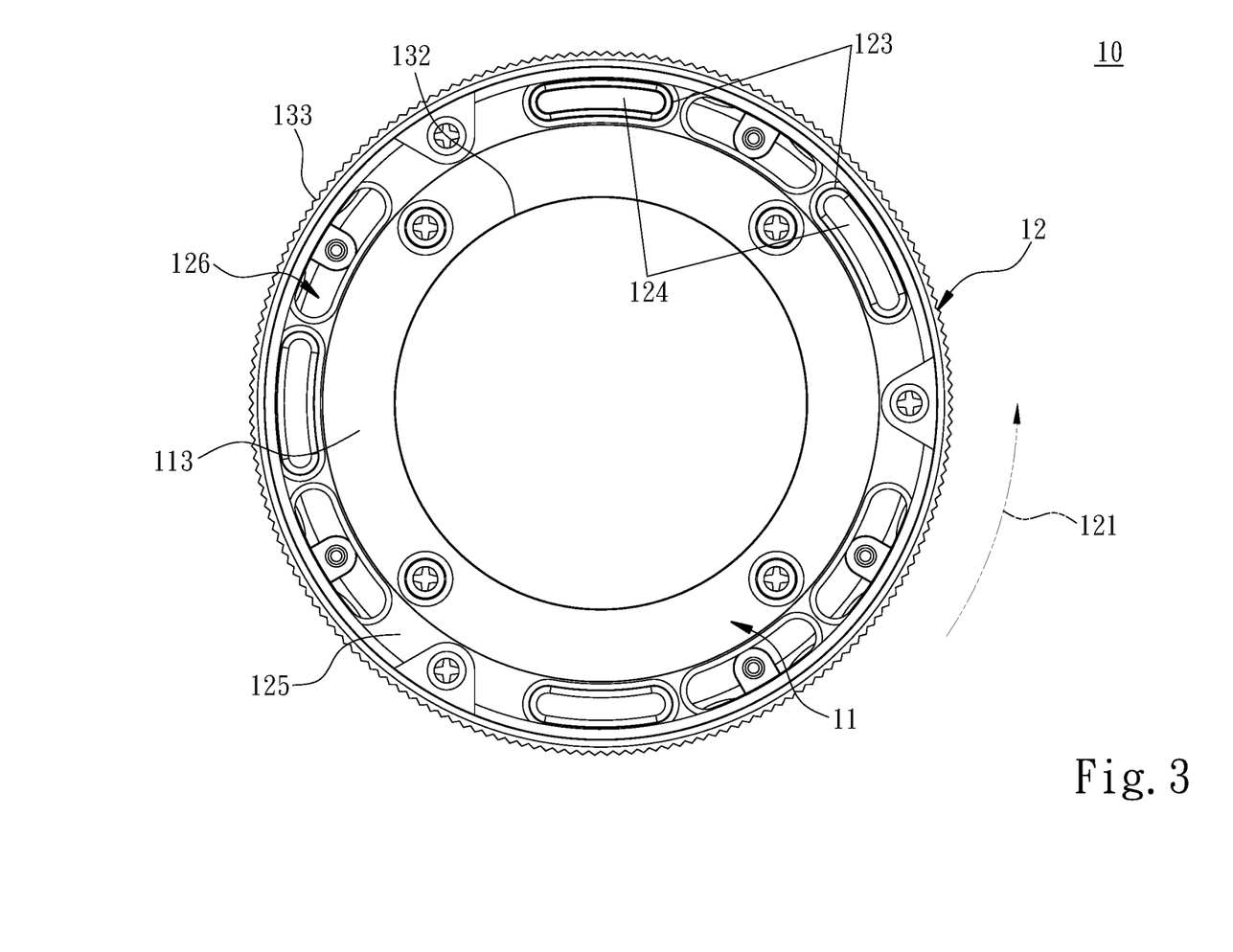
FIG. 3 is a bottom view of an embodiment of the invention.
Figure 4:
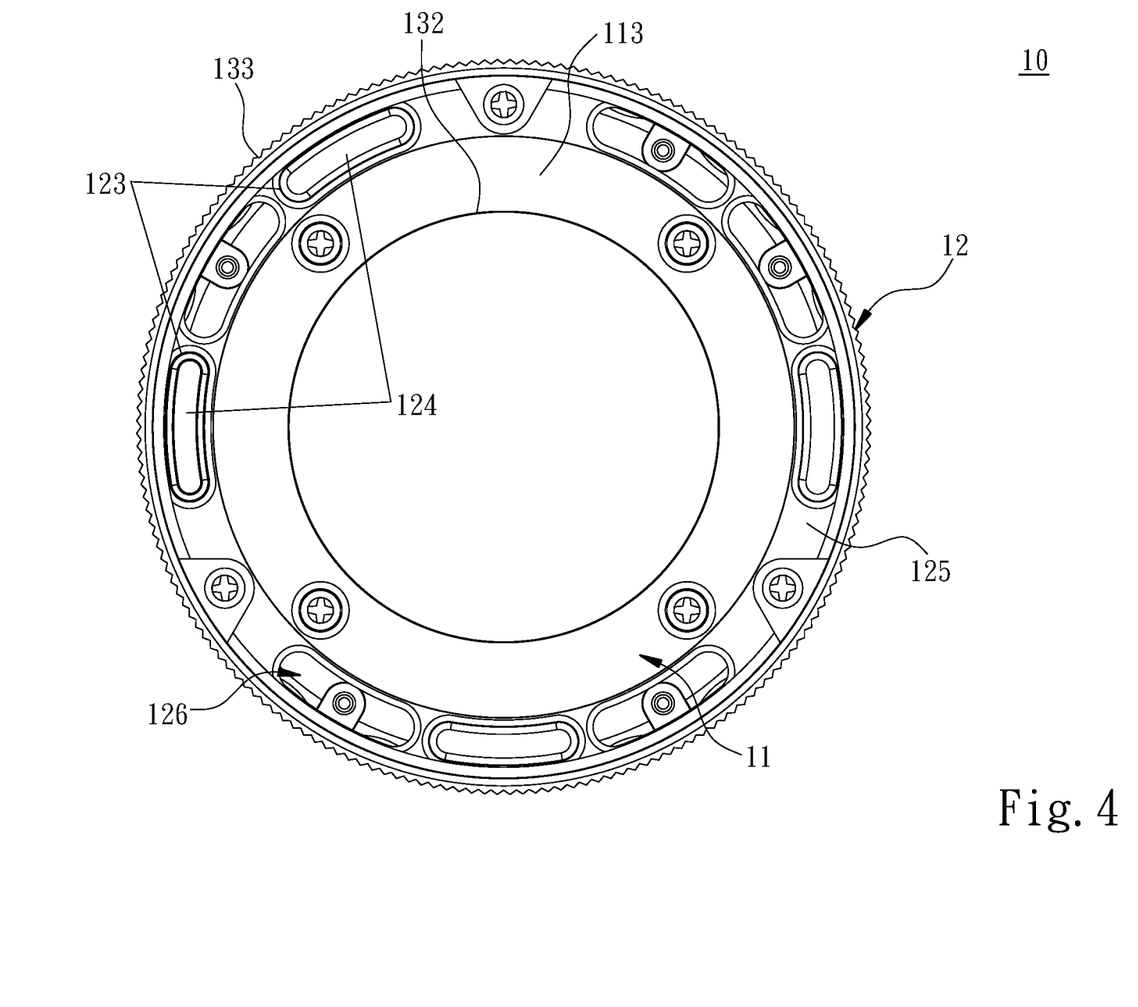
FIG. 4 is a bottom view of an embodiment of the invention during implementation.
Figure 5:
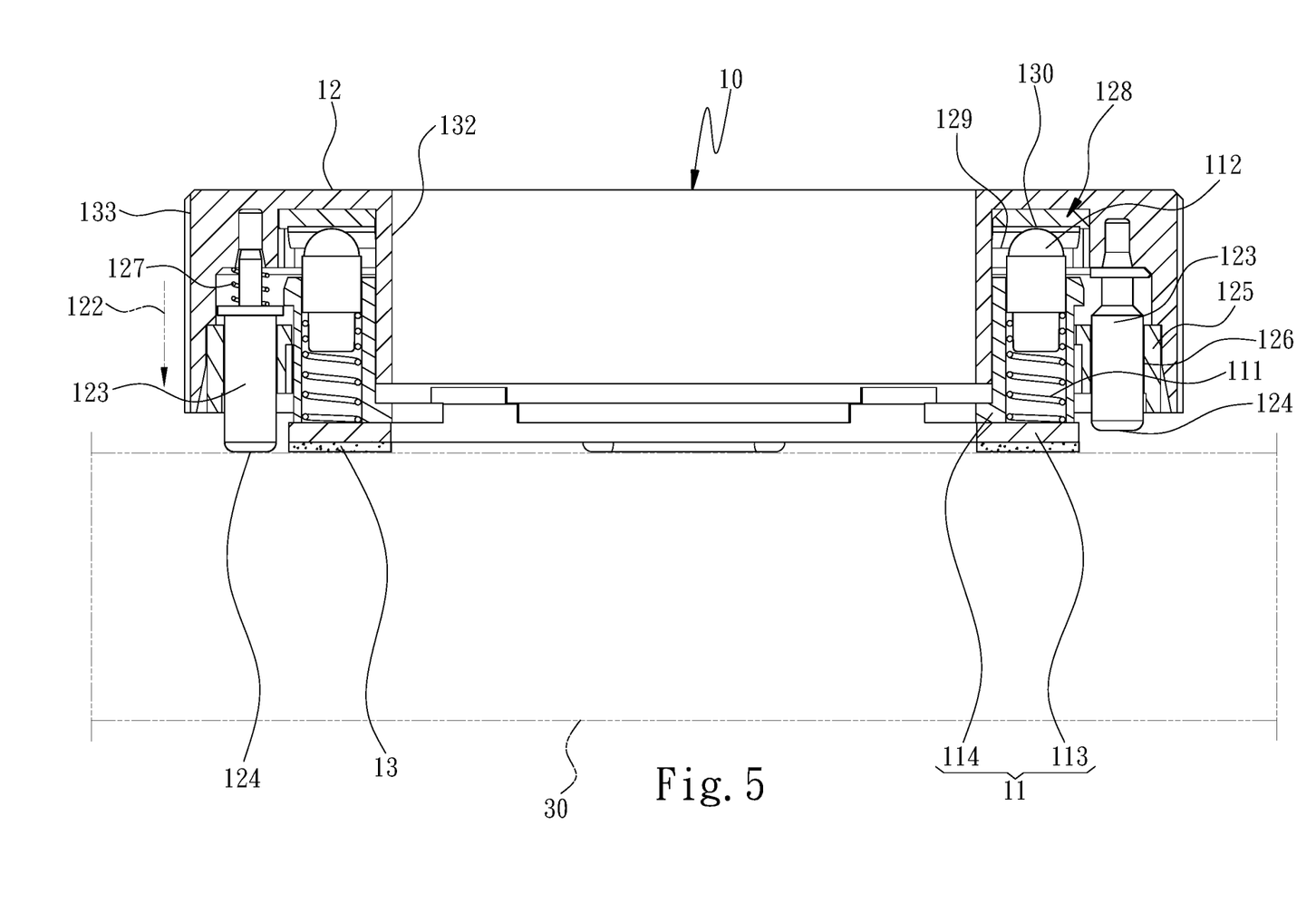
FIG. 5 is a cross-sectional view of an embodiment of the invention.
Figure 7:
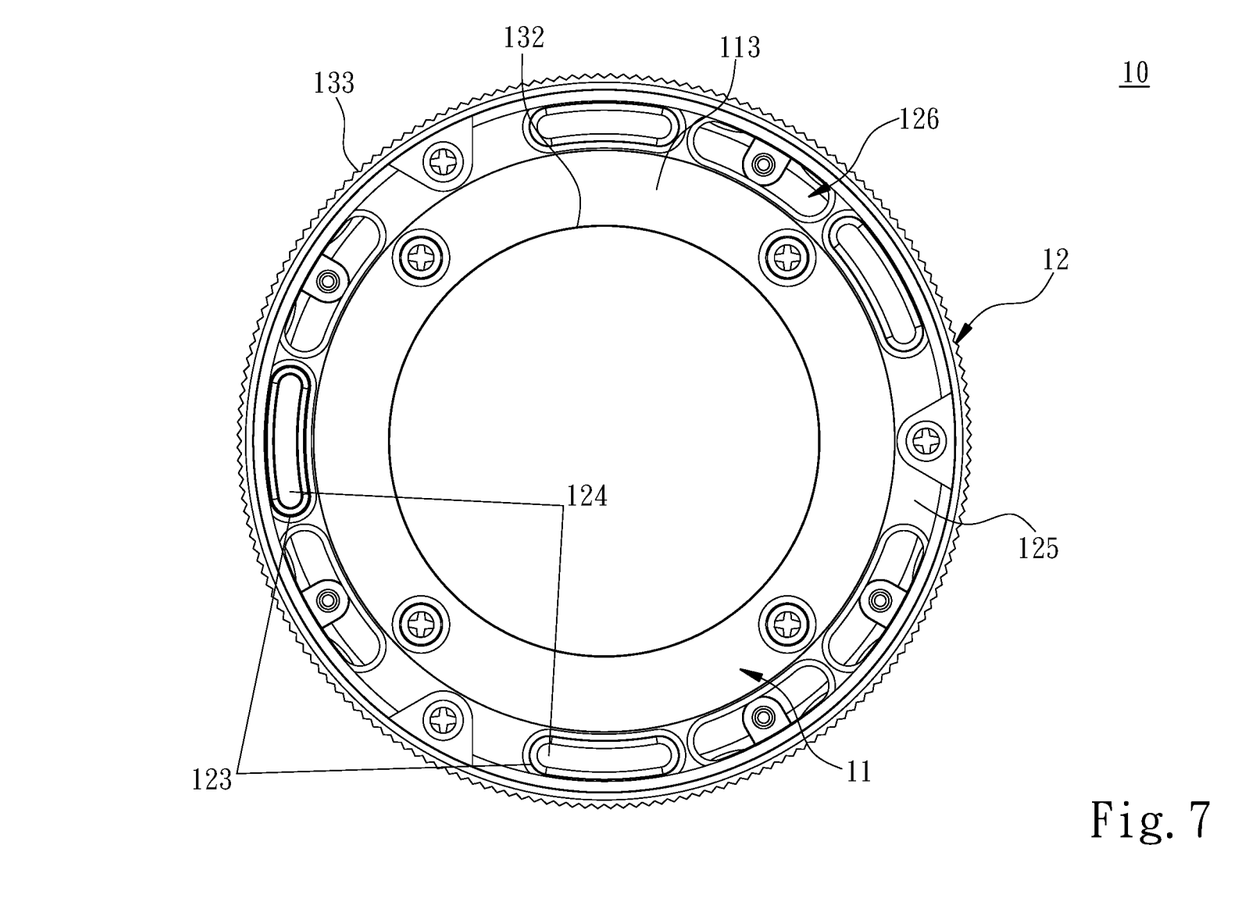
FIG. 7 is a bottom view of another embodiment of the invention.
Figure 8:
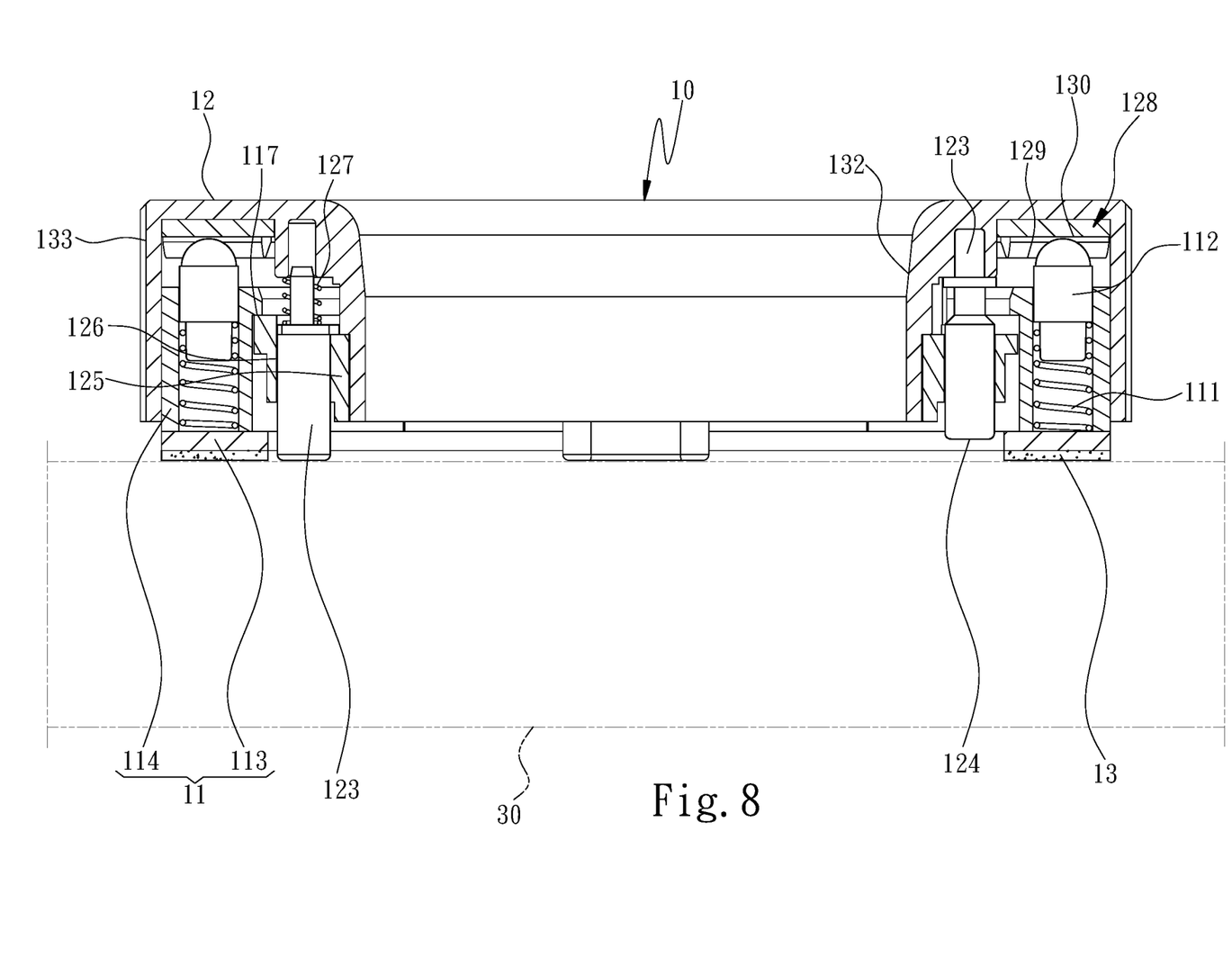
FIG. 8 is a cross-sectional view of yet another embodiment of the invention.

Continuing with the above, please refer to FIG. 1, FIG. 2 and FIG. 5. In one embodiment, the operating cap 12 is provided with a bracket 125. The bracket 125 connects with the base 11 and the touch control pads 123. The bracket 125 is formed with a plurality of mounting holes 126, and each of the plurality of mounting holes 126 is provided for mounting one of the plurality of touch control pads 123. Please refer to FIG. 7 as well, in this embodiment, a quantity of the plurality of mounting holes 126 is greater than a quantity of the plurality of touch control pads 123. Each of the plurality of touch control pads 123 can be optionally assembled with one of the plurality of mounting holes 126 based on requirements. The identification of the knob device 10 is performed by a polygonal shape jointly configured by some of the plurality of touch control pads 123 that contact with the touch screen 30 while the operating cap 12 does not perform the pressing stroke 122. For example in one embodiment, a quantity of the touch control pads 123 that contact with the touch screen 30 while the operating cap 12 does not perform the pressing stroke 122 is three, and it is assumed that there are multiple knob devices 10 provided on one touch screen 30, a computing component coordinating with the touch screen 30 identifies the multiple knob devices 10 based on different triangles configured by the touch control pads 123 provided on the knob devices 10, thereby enabling the touch screen 30 to be capable of equipping with multiple knob devices 10, and allowing the user to perform different touch controls on the touch screen 30.

Furthermore, please refer to FIG. 5 and FIG. 6. Since after the operating cap 12 performs the pressing stroke 122, the working surfaces 124 of the plurality of touch control pads 123 change from unequal heights to equal heights, at least one of the touch control pads 123 required to be extended and retracted relative to the remaining touch control pads 123. In one embodiment, at least one of the touch control pads 123 is provided with at least one auxiliary return component 127. The auxiliary return component 127 is connected to the operating cap 12 and is located on a side of at least one of the touch control pads 123 away from the working surfaces 124 to assist return of at least one of the touch control pads 123 after extension and retraction. In this embodiment, the at least one auxiliary return component 127 is provided on the touch control pads 123 that already achieve touch control when the operating cap 12 does not perform the pressing stroke 122.

Please refer to FIG. 1 and FIG. 2 again, the knob device 10 of the invention is capable of providing tactile feedback after being rotated. In one embodiment, the operating cap 12 is provided with a tactile feedback component 128. The tactile feedback component 128 faces the base 11 and is configured to rotate relative to the base 11 as the operating cap 12 rotates. A plurality of convex portions 129 and a plurality of concave portions 130 are formed on the tactile feedback component 128. The plurality of convex portions 129 and the plurality of concave portions 130 face the base 11 and are connected with one another alternately. The base 11 is provided with at least one column 112. The at least one column 112 is connected to at least one of the recovery elastic components 111 and is butted against by at least one of the recovery elastic components 111, thereby capable of contacting with a surface of the tactile feedback component 128. When the tactile feedback component 128 rotates, the at least one column 112 changes a position of contacting the convex portions 129 and the concave portions 130, thereby the operated knob device 10 is for providing tactile feedback to improve hand feel of operation.

In addition, the tactile feedback component 128 comprises a plurality of notches 131, and the plurality of notches 131 are disposed facing the plurality of touch control pads 123 to facilitate at least one of the plurality of touch control pads 123 to extend and retract.

Please refer to FIG. 5, FIG. 6, FIG. 7, and FIG. 8, in order to facilitate disposing the knob device 10 on the touch screen 30, in one embodiment of the invention, the knob device 10 comprises an adhesive 13 disposed on the base 11. Further, the operating cap 12 has an inner ring edge 132 and an outer ring edge 133. Based on requirements, the base 11 is disposed close to the inner ring edge 132 of the operating cap 12 or the base 11 is disposed close to the outer ring edge 133 of the operating cap 12. With the base 11 disposed close to the outer ring edge 133 of the operating cap 12, the knob device 10 is for providing a better dust-proof effect.

Continuing from above, please refer to FIG. 1 and FIG. 2. The base 11 comprises a base plate 113 connected to the recovery elastic components 111, and a bearing ring 114 provided on the base plate 113. The base plate 113 and the bearing ring 114 are provided with at least one assembly block 116 and at least one assembly slot 115 respectively. The at least one assembly slot 115 coordinates with and assembles with the at least one assembly block 116. In addition, the bearing ring 114 is connected to the bracket 125. The bracket 125 can be disposed along an inner ring periphery or an outer ring periphery of the bearing ring 114. The bearing ring 114 limits an assembly position of the bracket 125. The bearing ring 114 is provided with a retaining wall 117. The retaining wall 117 is located at an outer edge or an inner edge of the bearing ring 114 according to a disposed position of the bracket 125. The retaining wall 117 is raised to limit a position of the bracket 125.

What is claimed is:

1. A knob device for disposing on a touch screen, comprising:
   a base, provided with a plurality of recovery elastic components; and
   an operating cap, disposed on the base and having a rotation stroke for rotating relative to the base, and a pressing stroke for pressing the recovery elastic components, the operating cap provided with a plurality of touch control pads, each of the plurality of touch control pads comprising a working surface configured to contact the touch screen, wherein the working surface of at least one of the plurality of touch control pads is not at a same height as the working surfaces of other touch control pads;
   wherein when the operating cap performs the rotation stroke, working surfaces of some of the plurality of touch control pads contact the touch screen to activate a rotational touch control of the knob device, and wherein when the operating cap performs the pressing stroke, the working surfaces of the plurality of touch control pads contact the touch screen jointly to activate a click and touch control of the knob device.

2. The knob device for disposing on the touch screen as claimed in claim 1, wherein the operating cap is provided with a bracket connected to the base, and the bracket is formed with a plurality of mounting holes provided for disposing the touch control pads therein.

3. The knob device for disposing on the touch screen as claimed in claim 2, wherein a quantity of the mounting holes is greater than a quantity of the touch control pads.

4. The knob device for disposing on the touch screen as claimed in claim 3, wherein at least one of the touch control pads is provided with at least one auxiliary return component located on a side away from the working surfaces.

5. The knob device for disposing on the touch screen as claimed in claim 4, wherein the base comprises a base plate connected to the recovery elastic components, and a bearing ring provided on the base plate and connected to the bracket, the base plate is provided with at least one assembly block, and the bearing ring is provided with at least one assembly slot coordinating with the at least one assembly block.

6. The knob device for disposing on the touch screen as claimed in claim 5, wherein the bearing ring is provided with a retaining wall for limiting an assembly position of the bracket.

7. The knob device for disposing on the touch screen as claimed in claim 5, wherein the knob device comprises an adhesive disposed on the base.

8. The knob device for disposing on the touch screen as claimed in claim 1, wherein the operating cap is provided with a tactile feedback component facing the base and for rotating relative to the base, the tactile feedback component is formed with a plurality of convex portions and a plurality of concave portions connected with one another alternately, and the base is provided with at least one column connected with at least one of the recovery elastic components and for contacting a surface of the tactile feedback component.

9. The knob device for disposing on the touch screen as claimed in claim 8, wherein the tactile feedback component comprises a plurality of notches facing the touch control pads.

* * * * *